(12) United States Patent
Wright et al.

(10) Patent No.: US 8,004,455 B1
(45) Date of Patent: Aug. 23, 2011

(54) ANTENNA SIMULATOR

(75) Inventors: Buford S. Wright, Bedford, IN (US); Joseph Dang, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 865 days.

(21) Appl. No.: 12/028,798

(22) Filed: Feb. 9, 2008

(51) Int. Cl.
*G01S 7/40* (2006.01)
*H04B 17/00* (2006.01)
*H04W 24/00* (2009.01)

(52) U.S. Cl. ..... 342/169; 342/165; 455/423; 455/67.11; 455/115.1

(58) Field of Classification Search ............. 342/165, 342/169; 455/423, 67.11, 67.12, 67.13, 67.14, 455/67.15, 67.16, 115.1, 115.2, 115.3, 115.4
See application file for complete search history.

(56) References Cited

U.S. PATENT DOCUMENTS

| | | | | |
|---|---|---|---|---|
| 3,955,144 A | * | 5/1976 | Dishal | 375/295 |
| 3,982,244 A | * | 9/1976 | Ward et al. | 342/169 |
| 4,336,542 A | * | 6/1982 | Bielli et al. | 342/362 |
| 5,151,704 A | * | 9/1992 | Gunmar et al. | 342/360 |
| 5,223,840 A | * | 6/1993 | Cronyn | 342/170 |
| 5,339,087 A | * | 8/1994 | Minarik | 342/375 |
| 5,581,258 A | * | 12/1996 | Arico | 342/165 |
| 5,973,638 A | * | 10/1999 | Robbins et al. | 342/172 |
| 6,067,042 A | * | 5/2000 | Lee | 342/172 |
| 6,075,480 A | * | 6/2000 | Deliberis, Jr. | 342/169 |
| 6,075,986 A | * | 6/2000 | Chang et al. | 455/423 |
| 6,107,958 A | * | 8/2000 | Kelkar et al. | 342/169 |
| 6,236,363 B1 | * | 5/2001 | Robbins et al. | 342/360 |
| 6,346,909 B1 | * | 2/2002 | Johnson et al. | 342/169 |
| 6,657,214 B1 | * | 12/2003 | Foegelle et al. | 250/506.1 |
| 6,710,737 B1 | * | 3/2004 | Cronyn | 342/174 |
| 6,803,877 B2 | * | 10/2004 | Ludewig et al. | 342/169 |
| 7,099,662 B2 | * | 8/2006 | Fuenfgeld et al. | 455/423 |
| 7,308,608 B1 | * | 12/2007 | Pleis et al. | 714/30 |
| 7,348,919 B2 | * | 3/2008 | Gounalis | 342/165 |
| 7,430,413 B2 | * | 9/2008 | Fleury et al. | 455/423 |
| 7,432,856 B1 | * | 10/2008 | Hornbostel et al. | 342/372 |
| 7,667,634 B2 | * | 2/2010 | Shin et al. | 342/14 |
| 7,705,773 B2 | * | 4/2010 | Vacanti | 342/169 |
| 7,768,446 B2 | * | 8/2010 | Lin et al. | 342/169 |
| 7,852,260 B2 | * | 12/2010 | Sarafian | 342/169 |
| 2003/0003883 A1 | * | 1/2003 | Wallace et al. | 455/115 |
| 2004/0253950 A1 | * | 12/2004 | Fleury et al. | 455/424 |

OTHER PUBLICATIONS

De Baetselier et al. "Overcome the Challenges of Fast Changing Wireless Appliance Design Using Agilent EEsof AMDS." [Retrieved on Nov. 12, 2007], Retrieved from the internet. <http://www.mpdigest.com/issue/Articles/2007/oct/Agilent/>, 9 pgs.

* cited by examiner

*Primary Examiner* — Thomas Tarcza
*Assistant Examiner* — Peter Bythrow
(74) *Attorney, Agent, or Firm* — Christopher A. Monsey

(57) ABSTRACT

A method and apparatus for simulating antenna apparatuses are provided. In an illustrative embodiment, the apparatus comprises a first portion configured to produce a first and third plurality of signals and to receive a second plurality of signals from a transmitter, wherein said first and third plurality of signals are determined by more than one of a plurality of relationships between said transmitter and at least one antenna apparatus adapted to receive signals from said transmitter.

27 Claims, 9 Drawing Sheets

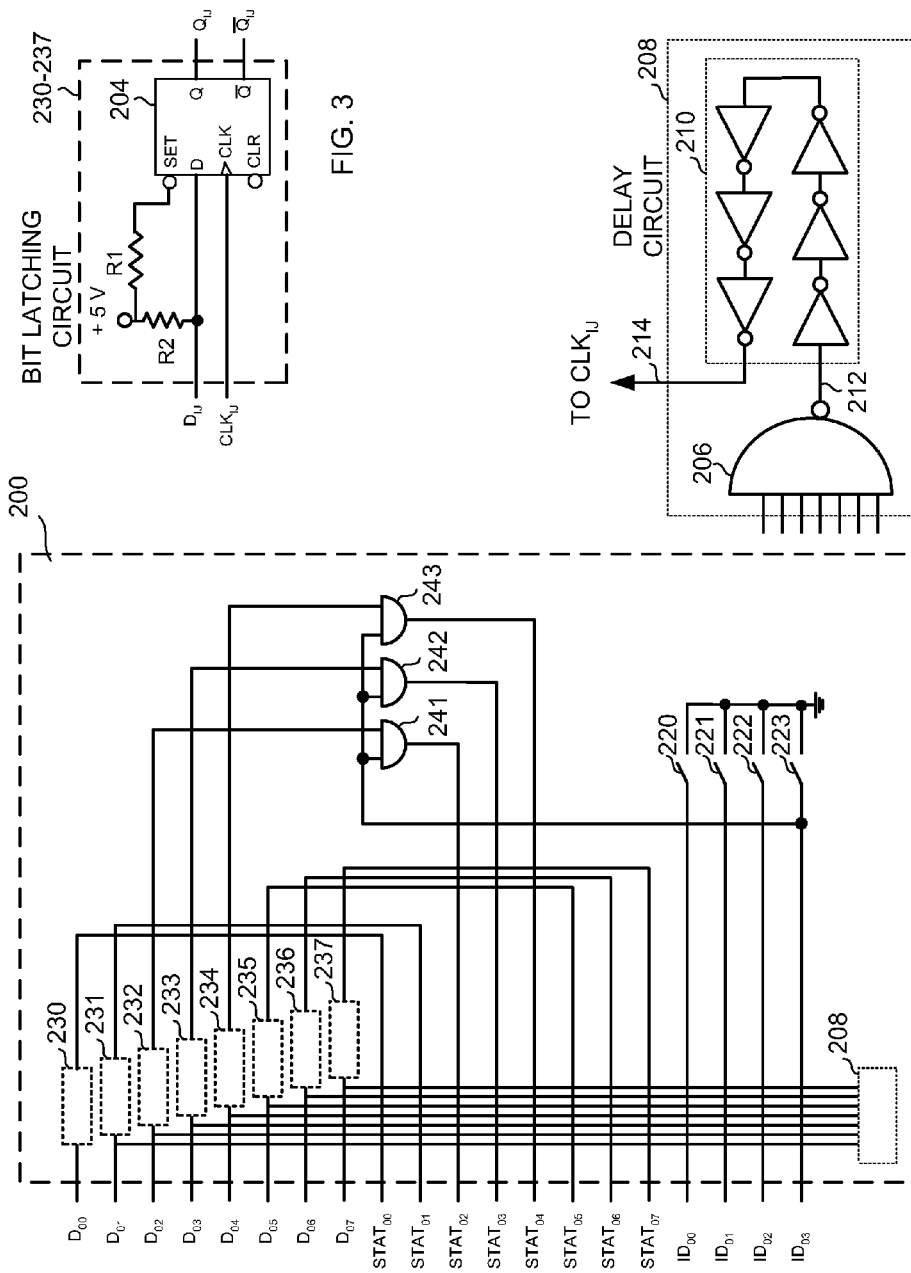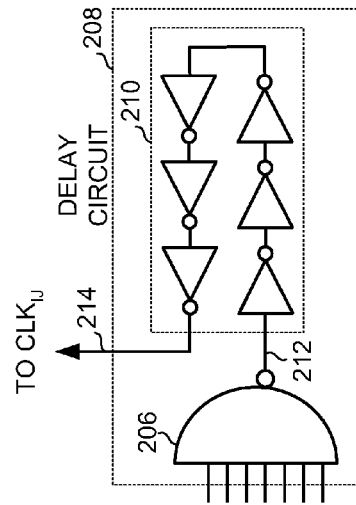

SIGNALS TABLE

| | A | | | | | B | | | C | |
|---|---|---|---|---|---|---|---|---|---|---|
| | FWD | AFT | RIGHT | LEFT | TEST | LOW | HIGH | TEST | ON | TEST |
| CONTROL SIGNALS | | | | | | | | | | |
| $D_{00}$ | 0 | - | - | - | - | - | - | - | 0 | - |
| $D_{01}$ | - | 0 | - | - | - | 0 | - | - | - | 0 |
| $D_{02}$ | - | - | 0 | - | - | - | 0 | - | - | - |
| $D_{03}$ | - | - | - | 0 | - | 0 | - | 0 | - | - |
| $D_{04}$ | - | - | - | - | 0 | - | 0 | - | - | - |
| $D_{05}$ | - | - | - | - | - | - | - | - | - | - |
| $D_{06}$ | - | - | - | - | - | - | - | - | - | - |
| $D_{07}$ | - | - | - | - | - | - | - | - | - | - |
| band ID | | | | | | | | | | |
| $ID_{00}$ | | | 0 | | | | 1 | | | 1 |
| $ID_{01}$ | | | 1 | | | | 0 | | | 1 |
| $ID_{02}$ | | | 1 | | | | 1 | | | 0 |
| $ID_{03}$ | | | 1 | | | | 1 | | | 0 |
| STATUS WORD | | | | | | | | | | |
| $STAT_{00}$ | 0 | 1 | 1 | 1 | 1 | 0 | 1 | 1 | 0 | 1 |
| $STAT_{01}$ | 1 | 0 | 1 | 1 | 1 | 1 | 0 | 1 | 1 | 0 |
| $STAT_{02}$ | 1 | 1 | 0 | 0 | 1 | 1 | 1 | 0 | 0 | 0 |
| $STAT_{03}$ | 1 | 1 | 1 | 1 | 1 | 0 | 1 | 1 | 0 | 0 |
| $STAT_{04}$ | 1 | 1 | 1 | 1 | 0 | 1 | 0 | 0 | 0 | 0 |
| $STAT_{05}$ | 0 | 0 | 0 | 0 | 0 | 0 | 0 | 0 | 0 | 0 |
| $STAT_{06}$ | 0 | 0 | 0 | 0 | 0 | 0 | 0 | 0 | 0 | 0 |
| $STAT_{07}$ | 0 | 0 | 0 | 0 | 0 | 0 | 0 | 0 | 0 | 0 |

FIG. 5

ANTENNA SIMULATOR

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

BACKGROUND OF THE INVENTION

The invention relates to the transmission of output signals including radio frequency (RF) signals. More particularly, the invention relates to an apparatus and method for simulating antenna operations to test the performance of signal processors such as transmitters and receivers.

An antenna, or antenna array, both terms referred to herein as "antenna apparatus," may be operationally coupled to a signal processor configured to transmit or receive signals. Antenna apparatuses may be generally configured to transmit communications and control signals with signal processors to ensure their proper operation. Signals may be configured to control many functions including, without limitation, mechanical steering of an antenna, and transmission and reception frequencies.

Antennas are generally selected to perform specific functions. It may be desirable at times to perform a plurality of functions. Traditionally, this would require a signal processor and antenna pair for each desired function. Alternatively, a signal processor might be designed to couple to more than one antenna apparatus, either simultaneously or one at a time. The signal processor must adapt to match the antenna apparatus (es) presently coupled to it. Signal processors designed to operate with more than one antenna apparatus, or with antenna apparatuses capable of performing more than one function, must feature controls that ensure the signal processor performs in the proper mode. Testing of such signal processor involves testing each operational mode.

SUMMARY OF THE INVENTION

A method and apparatus for simulating antenna apparatuses are provided. In an illustrative embodiment, the apparatus comprises a first signal processing portion adapted to produce a first and third plurality of signals and to receive a second plurality of signals from a transmitter. The first and third plurality of signals are determined by more than one of a plurality of relationships between the transmitter and at least one antenna apparatus adapted to receive signals from the transmitter. Each relationship comprises one of antenna selection, antenna direction, at least one state of an antenna control relay adapted to switch the output of the transmitter between a plurality of antennas adapted to receive the output signal from the transmitter, antenna polarization, antenna frequency and a test setting of the at least one antenna apparatus.

In an illustrative embodiment of the disclosure, a method for simulating an antenna apparatus coupled to a transmitter is provided. The method may be performed by an apparatus according to the disclosure. The method according to an illustrative embodiment includes the steps of removably coupling an antenna simulator to a signal processor, the antenna simulator comprising a receiving portion for receiving a plurality of control signals from the signal processor, an identification portion for providing a plurality of identification signals to the signal processor, and a status portion for providing a plurality of status signals to the signal processor. The method further includes the steps of providing a plurality of identification signals to the signal processor, the plurality of identification signals identifying an antenna apparatus adapted for coupling to the signal processor and receiving a plurality of control signals from the signal processor. The method also includes the steps of presenting a plurality of status signals to the signal processor, the plurality of status signals based on the plurality of control signals and the plurality of identification signals, wherein the plurality of status signals comprise at least one logical operation performed on at least one of the plurality of control signals, and wherein the at least one logical operation is determined based on a plurality of conditions associated with a simulated antenna apparatus comprising antenna selection, antenna control relay state, antenna orientation, antenna frequency, antenna polarization and an antenna test mode.

DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 2 is a schematic diagram of an antenna simulator according to an illustrative embodiment of the disclosure.

FIG. 3 is a latching circuit of an antenna simulator according to an illustrative embodiment of the disclosure.

FIG. 4 is a delay circuit of an antenna simulator according to an illustrative embodiment of the disclosure.

FIG. 5 is a signals table showing control, band ID and status signals corresponding to three different antenna types.

Figure 1:
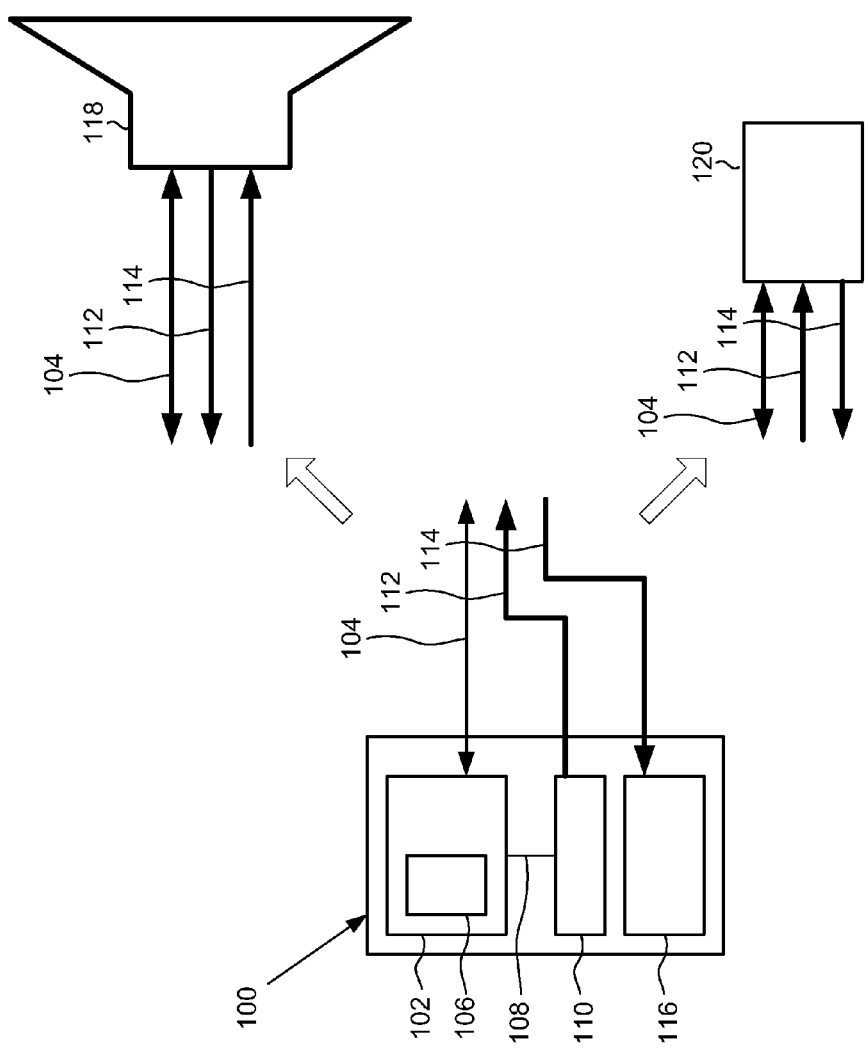
FIG. 1 is a conceptual diagram illustrating a signal processor, an antenna apparatus, and an exemplary antenna simulator suitable for performing the method according to an illustrative embodiment of the disclosure.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, an illustrative method and apparatus for simulating antenna apparatuses to evaluate the performance of signal processors are provided. FIG. 1 is a conceptual diagram illustrating a signal processing environment including a signal processor exemplified by transmitter 100, an antenna apparatus 118, and an antenna simulation apparatus, or antenna simulator, 120. Antenna simulator 120 is suitable for performing the method according to an illustrative embodiment of the disclosure.

Transmitter 100 is a transmitter configured to connect to different antenna apparatuses. Transmitter 100 has control portion 102 configured to send and receive a plurality of control, status, band, identification, configuration, or other signals over data bus 104. Transmitter 100 includes wave generator, or universal exciter, 106, shown as part of control portion 102, configured to generate wave signals. Wave generator 106 may also be configured as a separate portion of transmitter 100. Transmitter 100 may include a protection device (not shown) configured to protect transmitter 100 from damage. The protection device is configured to analyze a plurality of status signals and determine if antenna apparatus 118 is properly configured to receive an output signal, e.g., an RF signal. The protection device may be an analog or digital circuit, or a computing device configured to match status signals to expected configurations. Wave generator 106 is in electronic communication with a signal generator 110 through connector 108. Signal generator 110 amplifies the wave signals to produce output signals. When the protection device is activated, it prevents the transmission of a wave signal from wave generator 106 to signal generator 110 with the consequence that signal generator 110 does not output an output signal. When the protection device is deactivated, wave signals from wave generator 106 are transmitted to signal generator 110, and corresponding communication signals are output through cable 112.

Optionally, transmitter 100 may also include output signal characterization portion 116 for characterising a signal input through cable 114. In one embodiment, an output signal output through cable 112 is switched and returned through cable 114 for further processing. In another illustrative embodiment of a signal processor, a receiver, an output signal received from antenna apparatus 118 is input through cable 114, characterized, and further processed by communication signal characterization portion 116.

Signals may be digital or analog. For convenience, a plurality of signals, except communication signals, are referred to as words. Thus, a control word represents the values of control signals, an identification word represents identification signals, and a status word represents status signals. Furthermore, the evaluation and measurement of analog signals is referred to as "reading" in a manner analogous to reading of digital signals or words. Similarly, the production and presentation of on/off, 0/1 or high/low signals is referred to as "writing" although in the case of analog signaling, an analog value is produced or written which is matched to the requirements of the signal processor. In other words, an "on" signal, or "1", may be any analog value distinguishable by the signal processor from an "off" or "0" signal.

Figure 10:
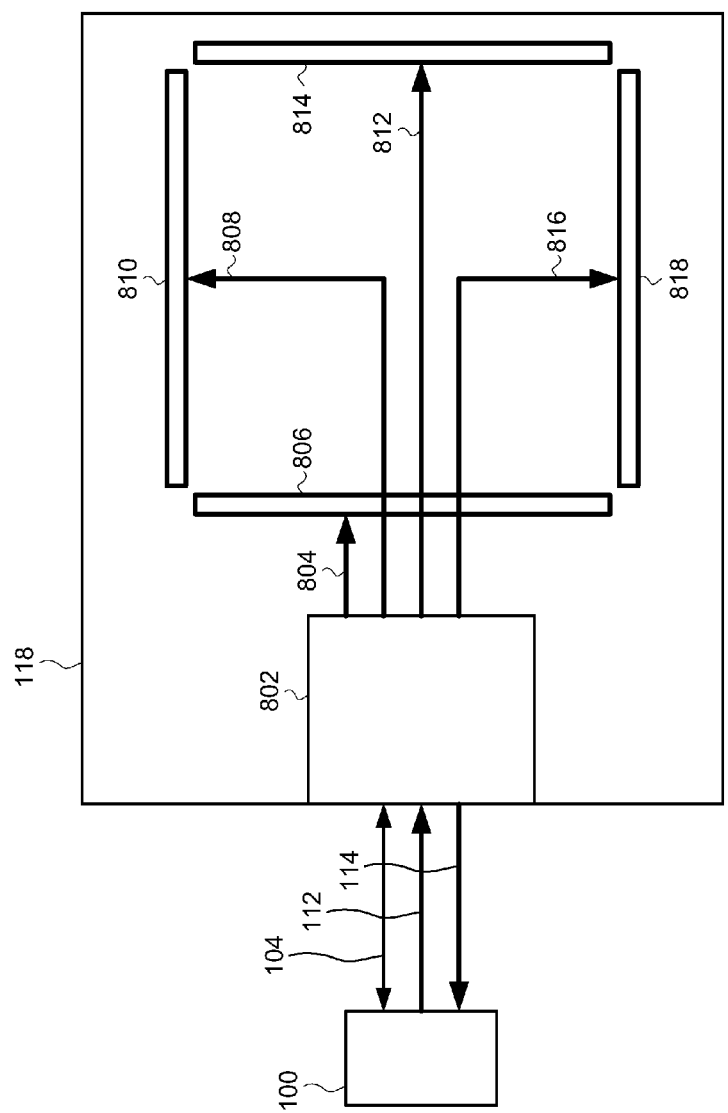
FIG. 10 is a conceptual diagram of a transmission environment.

Referring now to FIG. 10, a conceptual diagram of an exemplary antenna apparatus is shown. Antenna apparatus 118 includes antenna controller 802 configured to send/receive signals to/from transmitter 100 over data bus 104, to receive communication signals over cable 112, and to send communication signals over cable 114. Antenna controller 802 comprises a control relay (not shown) configured to redirect an output signal received through cable 112. The communication signal may be redirected to antenna 806 through cable 804, to antenna 808 through cable 810, to antenna 814 through cable 812, to antenna 818 through cable 816, or back to transmitter 100 through cable 114. Antenna controller 802 also comprises one or more logic components (not shown) configured to provide status signals to transmitter 100 and connectors configured to provide band and identification signals (band ID signals), to transmitter 100 over data bus 104. The band ID signals identify the antenna and band characteristics to transmitter 100. Antenna apparatus 118 may have a latching device for storing a control word initially provided by transmitter 100.

The operation of antenna apparatus 118 will now be illustrated to exemplify the function of its various components. Upon coupling antenna apparatus 118 to transmitter 100, transmitter 100 receives band ID signals from antenna apparatus 118. Based on the band ID signals, transmitter 100 produces a control word suitable for controlling antenna apparatus 118. Transmitter 100 also generates a wave signal suitable for transmission by antenna apparatus 118. Antenna controller 802 receives the control word from transmitter 100, for example a control word for transmitting an output signal through antenna 814. Antenna controller 802 activates the control relay to establish a connection between cable 112 and cable 812 for redirecting an output signal from transmitter 100 to antenna 814. Antenna controller 802 then provides a status word to data bus 104 indicating that the connection has been made. In other words, the transmitter produces a first plurality of signals, and the antenna produces a second and third plurality of signals based on different antenna and transmission requirements, e.g. type of antenna, one or more states of an antenna control relay adapted to switch outputs between a plurality of antennas adapted to receive communication signals from the transmitter, antenna polarization, antenna frequency, and antenna direction.

After a brief time period, e.g., 40 milliseconds, transmitter 100 reads data bus 104 to determine the status of antenna apparatus 118. If the status word indicates a properly completed connection by the control relay, transmitter 100 deactivates the protection device, thus enabling amplification of the wave signal into an output signal and transmission of the communication signal to antenna 814 through cables 112 and 812. Transmitter 100 periodically tests the status of antenna apparatus 118 to detect a change and to react accordingly. If the status word does not match the expected response, the protection device of transmitter 100 remains active.

Control words may control antenna operations of different antenna apparatuses in an analogous manner. For example, control words may direct mechanical steering of the antenna and may cause the antenna apparatus to engage frequency matching devices for matching communication frequencies to enable an antenna to transmit at various frequencies.

Referring now to FIG. 5, an exemplary signals table shows relationships between control, band ID, and status words. The table comprises rows corresponding to signals and columns corresponding to antenna apparatuses and their characteristics. Three antenna apparatuses labeled A, B and C are depicted. Each antenna apparatus has certain characteristics which differ from the others and all are configured to provide band ID signals to, receive control signals from, and provide status signals to a transmitter.

A first plurality of signals, shown as band ID signals, identify antenna apparatuses and, optionally, represent possible configurations of an antenna apparatus. Thus, the plurality of signals corresponding to an antenna apparatus must be unique. In other words, they must differ from the plurality of signals corresponding to another antenna apparatus so that a transmitter may identify each apparatus. While four band ID signals are shown, additional signals may be utilized. Additional band ID signals may be used to represent any distinguishing features communicable to a transmitter including, for example, unique configurations of similar antenna apparatuses.

A second plurality of signals, shown as control signals, indicate to an antenna apparatus, or the antenna simulator apparatus, a desired configuration of the apparatus. The apparatus interprets the second plurality of signals and adopts the specified configuration. In the embodiment of a transmitter depicted in the table, control signals $D_{00-07}$ float unless a grounding signal is provided by transmitter 100. A floating signal is depicted by a dash and a grounding signal is depicted by the number 0. For example, when control signal $D_{00}$ is grounded and provided to antenna apparatus A (shown in the first column), it indicates to the apparatus to switch a control relay to direct the transmitter's output signal to the FWD antenna. The same plurality of signals provided to antenna apparatus C would, analogously, turn ON a feature of the apparatus. In another example, when control signal $D_{01}$ is grounded and provided to antenna apparatus A (shown in the second column), it indicates to the apparatus to switch a control relay to direct the transmitter's output signal to the AFT antenna. The same plurality of signals provided to antenna apparatus C would, analogously, put the apparatus in TEST mode. Antenna apparatuses are discussed in more detail below.

A third plurality of signals, labeled "status word" in FIG. 5, indicate to the transmitter that the apparatus achieved the desired configuration. The status word configuration reflects the configuration of the first and second plurality of signals. The transmitter expects to receive a predefined status word as a response to each control word.

Antenna apparatus A may be an apparatus such as antenna apparatus 118, a conceptual illustration of which apparatus is shown in FIG. 10. Antenna apparatus A may also be an apparatus having a rotatable antenna which may be orientated several directions, e.g., forward, aft, right and left. Antenna apparatus A may also have the capability to redirect an output signal for testing. With respect to antenna apparatus A, $ID_{00}$ is grounded to indicate antenna apparatus type A. Control signals $D_{00-03}$ may be grounded to signal forward, aft, right, or left, respectively. $D_{04}$ may be grounded to indicate to antenna apparatus A to self-configure to redirect an output signal for transmission back to transmitter 100 for testing. Antenna apparatus A configures status signals $STAT_{00}$-$STAT_{04}$ to "0" when the corresponding control bit is "0", and to "1" when the corresponding control bit floats. $STAT_{05}$-$STAT_{07}$ are unused and equal "0" at all times.

Antenna apparatus B is any apparatus having one direction of transmission and capable of transmitting at two different, high and low, frequencies, e.g., V-pole antenna. Alternatively, antenna apparatus B could have vertical or horizontal polarization or any other dual-mode characteristic. With respect to antenna apparatus B, band ID signal $ID_{01}$ is grounded to indicate antenna apparatus type B. Signals $D_{00, 03}$ are grounded to signal low frequency, $D_{01, 04}$ are grounded to signal high frequency, and $D_{02, 04}$ are grounded to signal a test. $STAT_{00}$-$STAT_{04}$ equal "0" when the corresponding control bit is "0", and they equal "1" when the corresponding control bit floats. $STAT_{05}$-$STAT_{07}$ equal "0" at all times representing a logical operation on control bits $D_{05}$-$D_{07}$.

Antenna apparatus C is any apparatus having a characteristic that may be switched on or off such as polarization, e.g., vertical or horizontal. Signals $ID_{02-03}$ are grounded to indicate antenna apparatus type C. Signal $D_{00}$ is grounded to signal "on" and $D_{01}$ is grounded to signal test. $STAT_{00}$-$STAT_{01}$ equal "0" when the corresponding control bit is "0", and they equal "1" when the corresponding control bit floats. $STAT_{02}$-$STAT_{07}$ equal "0" at all times. Bits $STAT_{03}$-$STAT_{05}$ are used by antennas apparatus types A-B but not by type C.

Many variations of band ID connections are possible and as many antenna apparatuses may be used without conflict. Additional band ID connectors may be used to increase the number of antenna apparatuses and antenna characteristics and configurations that may be coupled to transmitter 100.

Figure 9:
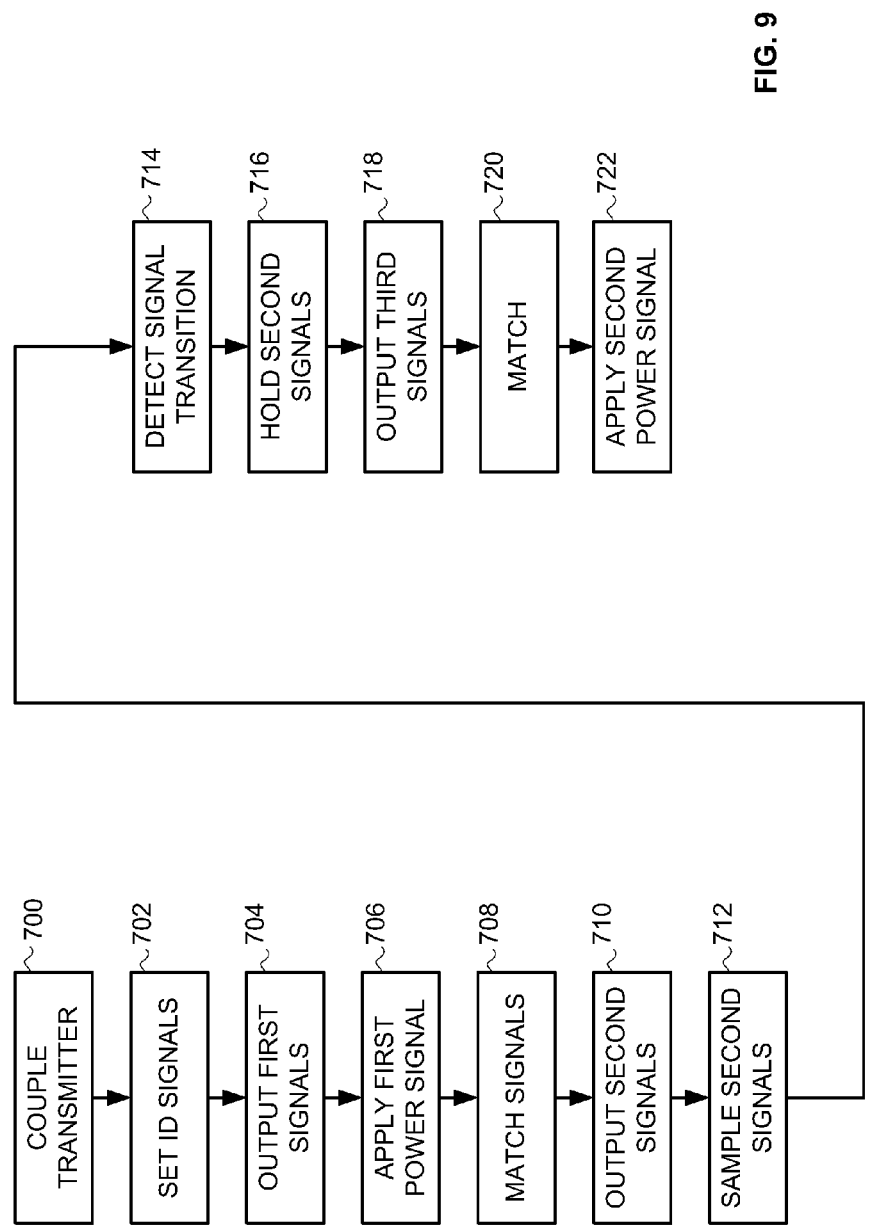
FIG. 9 is a block diagram of a method according to an illustrative embodiment of the disclosure.

Having provided the background necessary to understand the operation of the antenna simulator, a method of simulating an antenna apparatus according to one embodiment of the disclosure will now be described with reference to FIG. 9.

At Step 700, transmitter 100 is coupled to antenna simulator 120. By coupling it is meant that transmitter 100 and antenna simulator 120 are placed in logical communication with each other. Logical communication may be achieved by a data bus for transferring a plurality of logic signals including electronic signals and optical signals. In one embodiment, coupling further includes connection of the transmitter 100 output connector to the antenna simulator 120 communication signal input connector. In one embodiment, coupling further includes connection of the transmitter 100 communication signal input connector to the antenna simulator 120 test output connector.

At Step 702, a first plurality of signals are set in antenna simulator 120. The plurality of signals comprise at least one antenna apparatus identification signal representative of a selected antenna apparatus to be simulated. In one embodiment, the plurality of signals include signals indicating a setup, chosen from a plurality of setup options, available to the selected antenna apparatus. By setup options it is meant physical configurations which are not selectable by transmitter 100. In one illustrative embodiment, the plurality of signals correspond to the antenna band ID signals provided in FIG. 5.

At Step 704, the first plurality of signals is output by the said antenna simulator to the transmitter.

At Step 706, a first power signal is applied to a first portion of the transmitter. The power signal may be a signal generated by a wave generator. In one embodiment, a user manipulates a user interface component of transmitter 100 to select a wave configuration. In one embodiment, the first power signal may be generated when transmitter 100 is energized.

At Step 708, transmitter 100 matches the first plurality of signals with at least one predetermined signal pattern stored within transmitter 100. Upon matching, the range of output signals and number of antenna options through which transmitter 100 may transmit are reduced by the selection of the antenna apparatus. Thus, transmitter 100 only transmits output signals which the selected antenna apparatus is capable of transmitting.

At Step 710, transmitter 100 outputs a second plurality of signals to the antenna simulator. The second plurality of signals are selected based upon antenna selection, antenna orientation, one or more states of an antenna control relay adapted to switch an output signal of said transmitter between a plurality of antennas adapted to receive the output signal from said transmitter, antenna polarization, antenna frequency and a test setting of said at least one antenna. The selection encompasses the identification of one or more relationships from a plurality of relationships between transmitter 100 and at least one antenna apparatus. In an illustrative embodiment, one relationship is the type of antenna, e.g., omnidirectional or V-pole, and another relationship is the orientation of the antenna, e.g. FWD or AFT. In a further illustrative embodiment, one relationship is the type of antenna, and another relationship is the transmission band.

At Step 712, antenna simulator 120 samples the second plurality of signals.

At Step 714, antenna simulator 120 detects a transition in at least one of the second plurality of signals.

At Step 716, antenna simulator 120 holds the second plurality of signals after a predetermined time period. The predetermined time period starts when a transition is detected in at least one of the second plurality of signals. In one embodiment, the predetermined time period is the time required for the detected signal transition to pass through a number of logic circuits. More or less logic circuits may be added to increase or decrease the time period. After the time period, the second plurality of signals are held, or latched, such that they do not change at the output of the latching means during transmission of the output signal from transmitter 100.

At Step 718, antenna simulator 120 outputs a third plurality of signals to the transmitter. The third plurality of signals are determined based on the second plurality of signals after the predetermined time period. In an illustrative embodiment, the third plurality of signals are status signals adapted to indicate to transmitter 100 that the control instructions provided by a plurality of control signals were properly executed. In an illustrative embodiment, the status signals are produced by circuits. FIGS. 2-4 show a combination of latches having data outputs and inverted data outputs, and AND gates connected to switches 220-223, all configured to produce status signals. Alternatively, the status signals may be produced by an application (e.g. software) configured to look-up a status word in a database table.

At Step 720, transmitter 100 matches the third plurality of signals with at least one predetermined signal pattern stored within transmitter 100 and deactivates a transmitter protection device based upon said matching. If the match fails, indicating that the selected antenna apparatus, as simulated by antenna simulator 120, did not execute the instructions provided by the second plurality of signals, the transmitter protection device will remain activated.

At Step 722, transmitter 100 applies a second power signal to a second portion of the transmitter. In one embodiment, the second power signal is output to antenna simulator 120.

Optionally, the method further includes the step of receiving an output signal from transmitter 100 and measuring the output signal.

Transmitter 100 may periodically test the status of antenna simulator 120 to detect a change and to react accordingly. If the plurality of status signals do not match the expected response, the protection device of transmitter 100 may reactivate.

In an illustrative embodiment of an apparatus according to the disclosure, shown in FIGS. 2-4, the method steps are performed by circuits. In another illustrative embodiment, shown in FIGS. 6-7, at least one of the method steps are performed by a computing device including software.

Referring to FIG. 2, an exemplary antenna simulator according to an illustrative embodiment of the disclosure will now be described. FIG. 2 shows a schematic diagram of antenna simulator 120. Antenna simulator 120 comprises a first signal processing portion 200 comprising a first component configured to produce a first plurality of signals, a second component configured to receive a second plurality of signals from transmitter 100, and a third component configured to produce a third plurality of signals based on more than one of a plurality of relationships between the transmitter and at least one antenna apparatus.

The first component comprises four pins $ID_{00\text{-}03}$ adapted to provide a first plurality of signals to transmitter 100, and a plurality of switching portions exemplified by switches 220-223. In one embodiment, transmitter 100 causes pins $ID_{00\text{-}03}$ to float high until they are selectively grounded by transitioning switches 220-223 to simulate, at least partly, an antenna apparatus. In another embodiment, pins $ID_{00\text{-}03}$ are pulled high by resistors connected to a voltage source, and may be selectively grounded by transitioning switches 220-223.

The second component comprises eight pins $D_{00}$-$D_{07}$ adapted to connect data bus 104 to eight bit latching circuits 230-237, shown in FIG. 3, adapted to read and store the values of the second plurality of signals, and a delay circuit, shown in FIG. 4, for allowing the second plurality of signals to stabilize before being latched. In an illustrative embodiment, the delay circuit produces a delay of about 40 milliseconds. The delay may be longer or shorter depending on the characteristics of the first plurality of signals produced by transmitter 100. The delay should be long enough to enable the first plurality of signals to reach pins $D_{00}$-$D_{07}$, but short enough to enable the production of the status signals before transmitter 100 attempts to read them. In one exemplary embodiment, transmitter 100 reads status words with high frequency to effectuate a high degree of control. If transmitter 100 reads the status signals before they are properly produced, it will not recognize the status word and will not deactivate the protection circuit.

Each of pins $D_{00}$-$D_{07}$ is connected to the data pin of a corresponding bit latching circuit 230-237, and to a NAND gate input pin of delay circuit 208. The output pins of transmitter 100, which produce the first plurality of signals, may float or may be grounded through open-collector transistors. Each of latching circuits 230-237 has flip-flop IC 204 having a pin SET, data pin D, a clock pin CLK, a clear pin CLR, data out pin Q, and an inverted data out pin Q-bar. Each of latching circuits 230-237 has resistors R1 and R2. Resistor R1 is connected at one end to a positive voltage supply and at the other end to pin SET. Resistor R1 pulls up pin SET to enable flip-flop IC 204. Resistor R2 is connected at one end to a positive voltage supply and at the other end to data pin D. Resistor R2 pulls up a corresponding data pin D until one of control pins $D_{00}$-$D_{07}$ receives a grounding signal from transmitter 100 at which time data pin D becomes low.

The operation of clock pin CLK is described with reference to FIG. 4. When pin CLK is triggered, flip-flop IC 204 latches the input provided at data pin D, provides the same to out pin Q, and provides the reverse logical value to inverted data out pin Q-bar. Thus, triggering the clock simultaneously latches the values of control pins $D_{00}$-$D_{07}$ and provides them at out pins $Q_{00}$-$Q_{07}$.

Delay circuit 208 transitions when one of the second plurality of signals is pulled low. Pins $D_{00}$-$D_{07}$ are connected to NAND gate 206 of delay circuit 208. Output 212 of NAND gate 206 is provided to inverter IC 210 which includes six inverters. The inverters are connected back-to-back. Because there is an even number of inverters, the level of output 212 is the same as the level of output 214 of inverter IC 210. However, because the transition in the level of output 212 travels through six inverters, the transition in the level of output 214 is delayed, or time shifted, relative to the transition of level of output 212. More or less inverters may be provided to increase or decrease the amount of delay. In operation, all NAND gate 206 inputs must be high for NAND gate 206 to produce a low output level. Since the inputs are pulled high by resistors R2, output 212 is normally low. When one of pins $D_{00}$-$D_{07}$ are pulled down, the corresponding NAND gate 206 input is pulled down, and output 212 goes high. After a time delay required for the inverters to transition, output 214 goes high which triggers the clock pin of latching circuits 230-237 causing the circuits to latch.

The third component comprises eight pins $STAT_{o0-o7}$ for providing an 8-bit word, and a portion for performing logic operations that simulate the performance of an antenna controller. In one embodiment, the logic operations produce a plurality of signals corresponding to the status signals shown in FIG. 5. Output Q of latching circuits 230-231 is connected to each of pins $STAT_{00}$-$STAT_{01}$. Output Q of latching circuits 232-234 is connected to input pins of each of AND gates 241-243. The second input pin of AND gates 231-234 is connected to switch 223. The output pin of each AND gate 241-243 is connected to each pin $STAT_{02}$-$STAT_{04}$. Output Q-bar of latching circuits 235-237 is connected to each of status pins $STAT_{05}$-$STAT_{07}$. When switch 223 is open, $STAT_{00}$-$STAT_{01}$ equal $D_{00}$-$D_{01}$, $STAT_{02}$-$STAT_{04}$ equal $D_{02}$-$D_{04}$, and $STAT_{05}$-$STAT_{07}$ equal 0 because the D pins of latching circuits 235-237 are always pulled-up by resistors R2. When switch 223 is closed, $STAT_{00}$-$STAT_{01}$ equal $D_{00}$-$D_{01}$, and $STAT_{02}$-$STAT_{07}$ equal 0.

Antenna simulator 120 may receive and produce more or less signals than those shown, e.g., 4-bits, 12-bits, and 16-bits. The number of signals depends on the particular design of transmitter 100 and the relationships between it and at least one antenna apparatus.

In another illustrative embodiment of the disclosure, the antenna simulator comprises a computing device and the method is performed, at least partially, by computer programs or applications that manipulate data. A computing device is a device configured to execute instructions provided by computer application. An application, computer program, or program, is here, and generally, conceived to be a sequence of computer instructions representing steps of methods for achieving desired results. The steps might also be performed by a combination of a general computer and specific hardware components that contain hardwired logic for performing the steps. Programs may use data structures for both inputting information and producing the desired result. Data structures impart a physical organization on the data stored in computer memory and greatly facilitate data management. Databases include data structures and data. The actual physical implementation of a database on a general purpose computer may take several forms, from complete individual records storing the substantive information with several key indexes for locating a particular record, to a plurality of tables interrelated by relational operations, to a matrix of cross-linked data records, to various combinations and hybrids of these general types. Thus, while certain types of information may be described as being stored in a "database" from a conceptual standpoint, generally such information may be electronically stored in a variety of structures with a variety of encoding techniques.

Figure 6:
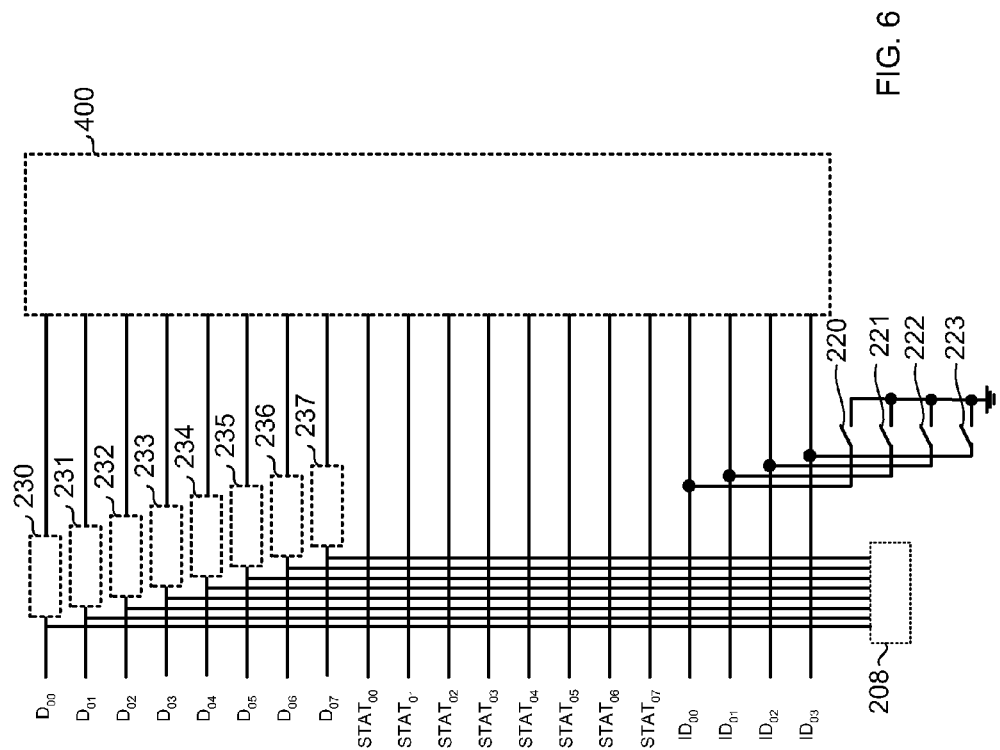
FIG. 6 is a schematic diagram of an antenna simulator according to an illustrative embodiment of the disclosure.
Figure 7:
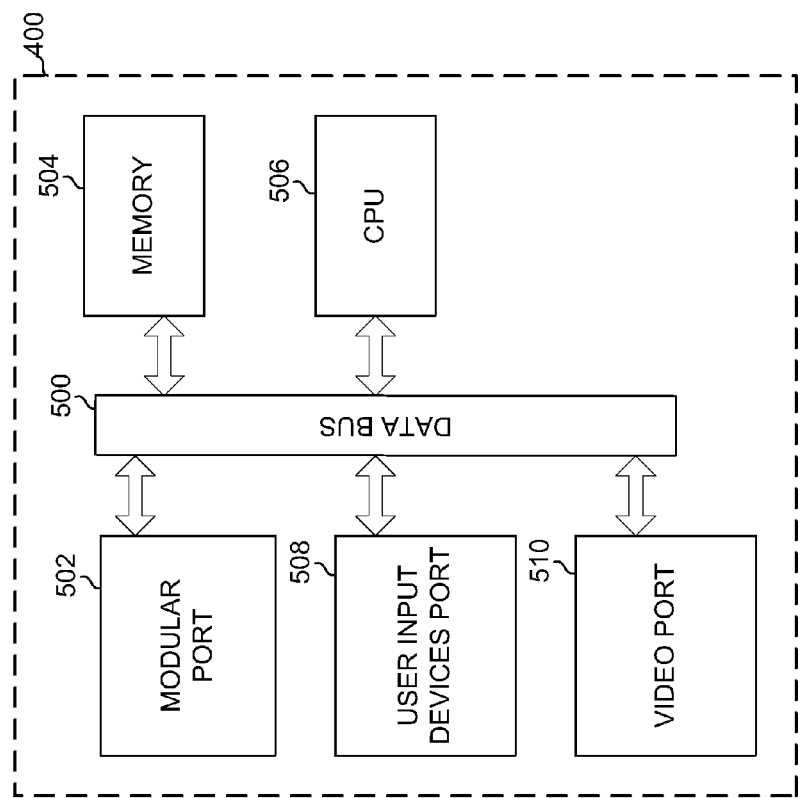
FIG. 7 is a conceptual diagram of a computing device configurable as a component of an antenna simulator according to an illustrative embodiment of the disclosure.

FIG. 6 is a schematic diagram of an illustrative embodiment of an antenna simulator according to the disclosure comprising computing device 400. The first and second components of antenna simulator are the same as was previously described with reference to FIG. 2. Computing device 400 performs logic operations that simulate the performance of an antenna controller. An exemplary computing device is shown in FIG. 7. Computing device 400 has data bus 500 connected to modular I/O port 502, memory 504, and CPU 506. Computing device 400 also has one or more user input devices ports 508 for connecting to input devices, e.g., keyboard and mouse, and video port 510 for coupling to video display devices.

To facilitate explanation, computing device 400 is generally discussed as if it were a single device. However, computing device 400 may actually comprise multiple physical and/or logical devices connected in a distributed architecture, and the various functions performed may actually be distributed among multiple devices. Additionally, in alternative embodiments, the functions performed by computing device 400 may be consolidated and/or distributed differently than as described. For example, any function can be implemented on any number of machines or on a single machine. Also, any process may be divided across multiple machines.

Modular port 502 may include one or more modules. In an illustrative embodiment, computing device 400 is a computer having one module connected to modular port 502. The module comprises eight digital input pins for receiving a word from latching circuits 230-237, four bits for receiving band ID information from switches 220-223, and eight output bits for presenting a status word to transmitter 100. The band ID and status pins may be analog or digital depending on the requirements of transmitter 100. The module has circuits for conditioning control and band ID signals prior to transmission over data bus 500, manipulation by CPU 506, and presentation at modular port 502. For example, the module may comprise solid-state relays having isolated contacts, or may have transistors comprising open-collector outputs. The configuration of modules depends from the requirements of transmitter 100.

In another illustrative embodiment, computing device 400 is a programmable logic controller (PLC) configured to receive a plurality of modules on modular port 502. Modules including analog, digital, input, and output ports to suit the requirements of transmitter 100.

Memory 504 can be any available media that can be accessed by the computing device 400 including RAM, ROM, EEPROM, flash memory and any other medium which can be used to store the desired information and which can be accessed by computing device 400. Memory 504 provides storage of computer-readable instructions, software applications, data structures, program modules and other data for the computing device 400. Applications stored in memory 504 are configured to perform logic operations representative of the relationships between transmitter 100 and at least one antenna apparatus. In other words, memory 504 also comprises a database for storing status words corresponding to various control words and band ID words. Responsive to a control word and band ID word, CPU 506 processes programmed instructions to search the database for a corresponding status word. CPU 506 provides the status word for presentation at modular port 502 at pins $STAT_{01}$-$STAT_{07}$. An exemplary embodiment of corresponding control words, band ID words, and status words, for antenna apparatuses A, B, and C is shown in FIG. 5.

Figure 8:
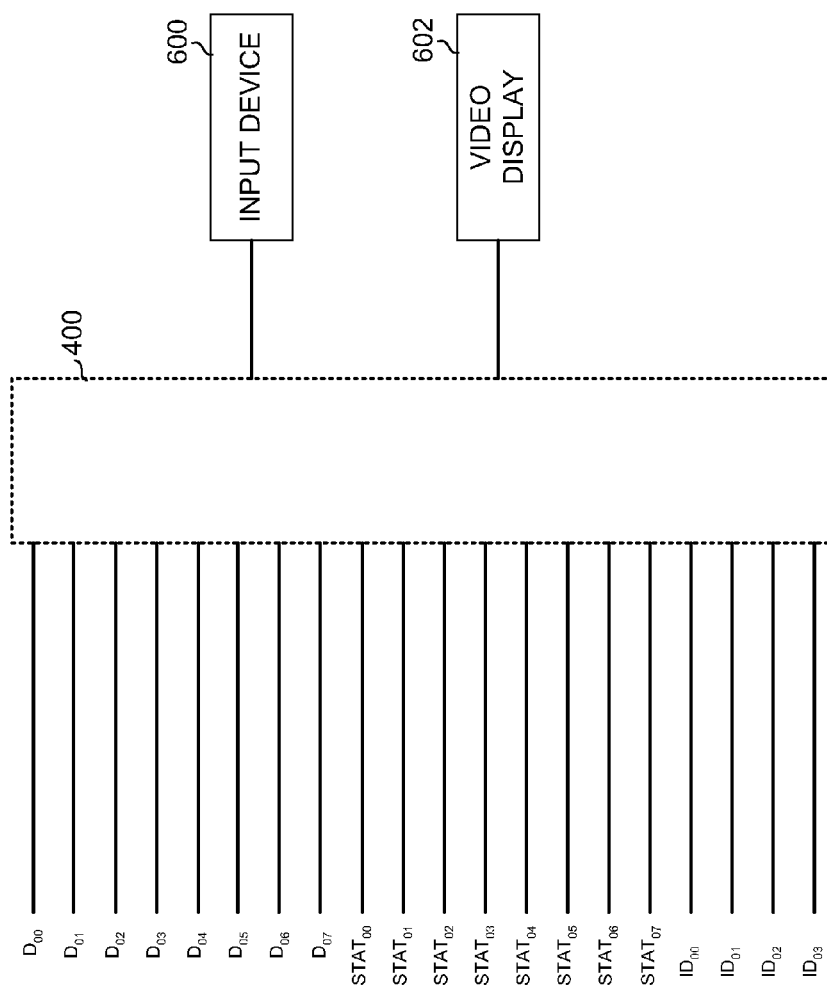
FIG. 8 is a schematic diagram of another antenna simulator according to an illustrative embodiment of the disclosure.

FIG. 8 is a conceptual diagram of an illustrative embodiment antenna simulator according to the disclosure comprising computing device 400. Computing device 400 produces a first and third plurality of signals and receives a second plurality of signals from transmitter 100. Computing device 400 also comprises input devices 600, video display 602, and applications (not shown) configured to receive user inputs from input devices 600. An application provides screen displays on video display 602 to enable user to select relationships that the antenna simulator will simulate. An application also provides users access to a database to populate data tables with status words corresponding to control words and band ID words.

Figure 11:
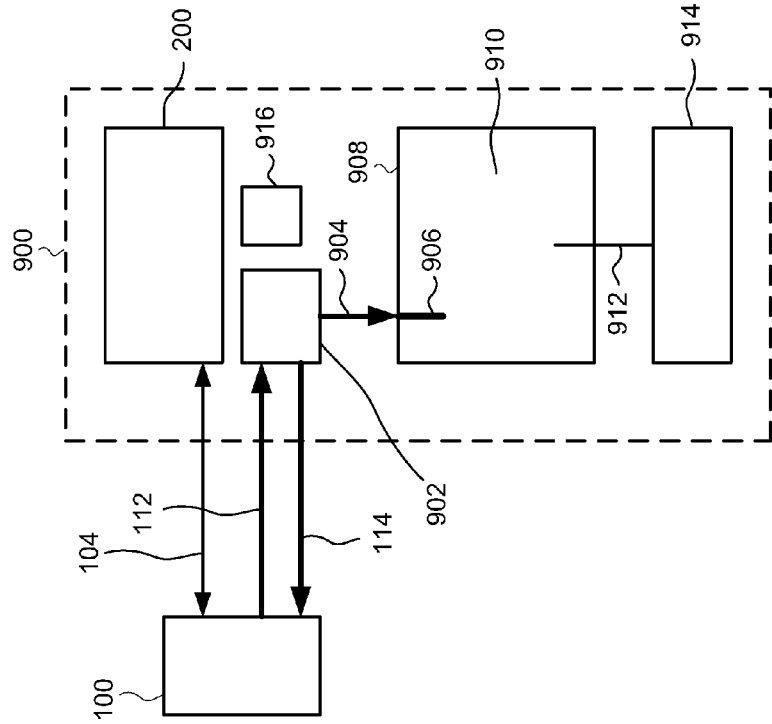
FIG. 11 is a conceptual diagram of a testing environment showing a simulation apparatus according to an illustrative embodiment of the disclosure.

In a further illustrative embodiment according to the disclosure, an antenna simulator comprises a portion adapted to receive an output signal from a transmitter which simulates an electrical load on said transmitter and further comprises an output signal measuring portion for measuring output signals and properties of said transmitter after it is energized. FIG. 11 shows an exemplary testing environment comprising transmitter 100, antenna simulator 900, data bus 104 and cables 112, 114 connecting transmitter 100 and antenna simulator 900. Antenna simulator 900 comprises a first signal processing portion 200, antenna control relay 902, fluid containment device 908 containing fluid 910, measurement probe 912 and meter 914. Upon first signal processing portion 200's satisfactory production and reception of a first, second, and third plurality of signals as previously described, and transmitter 100's reception of said third plurality of signals, transmitter 100 energizes and transmits an output signal over cable 112. Control relay 902 directs the output signal through cable 904 to device 906. In an illustrative embodiment, device 906 is a resistive coil. Device 906 transmits the output signal to fluid 910 causing fluid 910 to absorb the output signal's energy. Measurement probe 912 detects changes in fluid 910 temperature, and the detected changes are measured by meter 914. In an illustrative embodiment, fluid 910 comprises water and meter 914 comprises a calorimeter. Changes in temperature may be correlated to characteristics of transmitter 100.

Antenna simulator 900 further illustratively includes antenna controller 916 configured to switch antenna control relay 902. In an illustrative embodiment, antenna controller 916 is a manual switch configured to cause antenna control relay 902 to switch between the electrical load simulation portion and retransmission to transmitter 100 over cable 114. In an illustrative embodiment, antenna controller 916 is in electronic communication with antenna simulator 900 and reads the first plurality of signals received by antenna simulator 900 to determine, and set, the position of antenna control relay 902.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An antenna simulator apparatus comprising:
a first signal processing portion adapted to produce a first and third plurality of signals and receive a second plurality of signals from a transmitter, wherein said first and third plurality of signals are determined by more than one of a plurality of relationships between said transmitter and at least one antenna apparatus adapted to receive signals from said transmitter, wherein each said relationship comprise one of antenna selection, antenna direction, at least one state of an antenna control relay adapted to switch the output of said transmitter between a plurality of antennas adapted to receive the output signal from said transmitter, antenna polarization, antenna frequency and a test setting of said at least one antenna apparatus, wherein at least one of said relationships are determined based upon a plurality of signals needed to operate a protection device for said transmitter required to permit said transmitter to transmit an output signal.

2. An antenna simulator apparatus as in claim 1, further comprising logic circuits which produce one or more said first and third plurality of signals based on said second plurality of signals such that logic in a protection device in said transmitter operates to permit said transmitter to energize and output a radio frequency signal.

3. An antenna simulator apparatus as in claim 1, wherein said at least one antenna apparatus comprises a plurality of antennas controlled by an antenna controller.

4. An antenna simulator apparatus as in claim 1, further comprising a portion adapted for receiving an output signal from said transmitter which simulates an electrical load on said transmitter and further comprising a signal measuring portion adapted for measuring output signals and properties of said transmitter after it is energized.

5. An antenna simulator apparatus as in claim 1, further comprising a delay circuit adapted to ensure a plurality of logic circuits receive said second plurality of signals and hold said second plurality of signals.

6. An antenna simulator apparatus as in claim 1, wherein said second plurality of signals are control signals for controlling at least one portion of at least one antenna apparatus designed to be coupled to said transmitter.

7. An antenna simulator apparatus as in claim 6, wherein said at least one portion of at least one antenna apparatus is an antenna radio frequency relay.

8. An antenna simulator apparatus as in claim 1, wherein said first plurality of signals are band or antenna identification signals.

9. An antenna simulator apparatus as in claim 8, wherein said first plurality of signals are determined by a switching portion for selectively coupling said switching portion with a ground.

10. An antenna simulator apparatus as in claim 1, wherein said third plurality of signals are status words that are output from at least one portion of at least one antenna apparatus adapted to be coupled to said transmitter.

11. An antenna simulator apparatus as in claim 10, wherein said status words comprise antenna identification, band identification, antenna orientation, one or more states of an antenna control relay adapted to switch the output of said transmitter between a plurality of antennas adapted to receive the output signal from said transmitter, antenna frequency, antenna polarization or a test mode of an antenna apparatus adapted to be coupled to said transmitter.

12. An antenna simulator apparatus comprising:
a plurality of switching portions for selectively coupling said plurality of switching portions with a ground to produce a first plurality of signals;
an input signal bus coupled to a transmitter output bus and adapted to receive a second plurality of signals;
a first plurality of logic circuits for receiving, storing and outputting said second plurality of signals;
a second plurality of logic circuits adapted to control the time period after which said first plurality of logic circuits store said second plurality of signals, said second plurality of logic circuits causing said first plurality of logic circuits to store said second plurality of signals at the transition of a clock signal generated by said second plurality of logic circuits at the end of said time period; and
a third plurality of logic circuits adapted to perform at least one logical operation on the signals output from said first plurality of logic circuits based on at least one of said first plurality of signals and output a third plurality of signals based on the result of the at least one logical operation.

13. An antenna simulator as in claim 12, wherein said time period is based on the time required for all of said second plurality of signals to be generated by said transmitter.

14. An antenna simulator as in claim 12, wherein said second plurality of signals are control signals which control at least one portion of an antenna apparatus coupled to said transmitter.

15. A method for simulating an antenna apparatus coupled to a transmitter comprising:
coupling a transmitter to an antenna simulator;
setting a first plurality of signals, said first plurality of signals comprising at least one antenna identification signal;
outputting said first plurality of signals from said antenna simulator to said transmitter;
applying a first power signal to a first portion of said transmitter;
matching said first plurality of signals with at least one predetermined signal pattern stored within said transmitter;
outputting a first plurality of signals from said transmitter to said antenna simulator, wherein said first plurality of signals are selected based upon at least one of antenna selection, antenna orientation, one or more states of an antenna control relay adapted to switch an output signal of said transmitter between a plurality of antennas adapted to receive the output signal from said transmitter, antenna polarization, antenna frequency and a test setting of said at least one antenna;
sampling said second plurality of signals in said antenna simulator;
detecting a transition in at least one of said second plurality of signals;
holding said second plurality of signals after a predetermined time period, said predetermined time period beginning upon the detection of a transition in at least one of said plurality of signals;
outputting a third plurality of signals from said antenna simulator to said transmitter, said third plurality of signals determined based on said second plurality of signals after said predetermined time period;
matching said third plurality of signals with one or more predetermined signal patterns stored within said transmitter and deactivating a protection device for said transmitter based upon said matching of said first and third plurality of signals; and
applying a second power signal to a second portion of said transmitter.

16. A method as in claim 15, wherein said predetermined signal patterns are determined based upon a plurality of relationships between said components associated with said transmitter and components associated with at least one antenna apparatus adapted to receive and emit signals from said transmitter, wherein said relationships comprise antenna selection, antenna orientation, one or more states of an antenna control relay adapted to switch the output of said transmitter between a plurality of antennas adapted to receive the output from said transmitter, antenna polarization, antenna frequency or a test setting of said at least one antenna.

17. A method as in claim 16, further comprising setting antenna control parameters in said transmitter.

18. An apparatus configured to simulate one or more antenna apparatuses comprising:

a receiving portion configured to receive a plurality of control signals provided by a signal processor removably coupled to said apparatus, said plurality of control signals adapted to control at least one antenna apparatus adapted to be coupled to said signal processor;
an identification portion configured to provide a plurality of identification signals to said signal processor, said identification signals based on one or more characteristic of an antenna apparatus comprising antenna identification and band identification;
a status portion configured to provide a plurality of status signals to said signal processor, said plurality of status signals based on said plurality of control and identification signals, wherein at least one of said plurality of status signals comprise at least one logical operation on at least one said plurality of control signals, and wherein said at least one logical operation is determined based on a plurality of conditions associated with a simulated antenna apparatus, each said condition comprising one of antenna selection, antenna control relay state, antenna orientation, antenna frequency, antenna polarization and an antenna test mode.

19. An apparatus as in claim 18, wherein said receiving portion comprises a plurality of latching circuits for storing said plurality of control signals and a delay circuit for detecting a transition in at least one of said plurality of control signals and causing said plurality of latching circuits to store said plurality of control signals after a predetermined time period, said predetermined time period beginning upon the detection of a transition in at least one of said plurality of control signals.

20. An apparatus as in claim 18, wherein said at least one logical operation comprises setting at least one of said plurality of status signals to 0 irrespective of the value of said plurality of control signals.

21. An apparatus as in claim 18, wherein said at least one logical operation comprises setting at least one of said plurality of status signals to 0 when at least one of said identification signals is 0 irrespective of the values of said plurality of control signals, and setting the said at least one of said plurality of status signals to the value of a corresponding control signal when said at least one of said identification signals is 1.

22. An apparatus as in claim 18, wherein said status portion comprises a computing device having at least one output module adapted to output a plurality of status signals, said computing device further comprising at least one input module for receiving said plurality of control signals and said plurality of identification signals, and wherein said computing device comprises applications configured to produce status signals based on said plurality of control signals and said plurality of identification signals.

23. An apparatus as in claim 22, wherein said at least one output module comprises relays having isolated contact outputs.

24. An apparatus as in claim 22, wherein said at least one output module comprises open-collector outputs.

25. An apparatus as in claim 22, wherein said receiving portion comprises an input module coupled to said computing device and adapted for receiving and communicating said plurality of control signals to said computing device.

26. An apparatus as in claim 22, wherein said identification portion comprises applications configured to produce a plurality of identification signals based on input provided to said computing device by a user.

27. A method of using an antenna simulator comprising the steps of:

removably coupling an antenna simulator to a signal processor, said antenna simulator comprising a receiving portion for receiving a plurality of control signals from said signal processor, an identification portion for providing a plurality of identification signals to said signal processor, and a status portion for providing a plurality of status signals to said signal processor;

providing a plurality of identification signals to said signal processor, said plurality of identification signals identifying an antenna apparatus adapted for coupling to said signal processor;

receiving a plurality of control signals from said signal processor; and presenting a plurality of status signals to said signal processor, said plurality of status signals based on said plurality of control signals and said plurality of identification signals, wherein said plurality of status signals comprise at least one logical operation performed on at least one of said plurality of control signals, and wherein said at least one logical operation is determined based on a plurality of conditions associated with a simulated antenna apparatus, each said condition comprising one of antenna selection, antenna control relay state, antenna orientation, antenna frequency, antenna polarization and an antenna test mode.

* * * * *